(12) United States Patent
Ogawa et al.

(10) Patent No.: US 11,081,757 B2
(45) Date of Patent: Aug. 3, 2021

(54) BATTERY

(71) Applicants: KABUSHIKI KAISHA TOSHIBA, Minato-ku (JP); Toshiba Infrastructure Systems & Solutions Corporation, Kawasaki (JP)

(72) Inventors: Takaya Ogawa, Kawasaki (JP); Keitaro Hino, Tokyo (JP); Tadashi Fujisawa, Kawasaki (JP); Shinya Aikawa, Hamura (JP); Hiroaki Asai, Fujisawa (JP); Tomonori Ezoe, Kawasaki (JP); Seiji Ito, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 23 days.

(21) Appl. No.: 16/022,006

(22) Filed: Jun. 28, 2018

(65) Prior Publication Data

US 2019/0140232 A1 May 9, 2019

(30) Foreign Application Priority Data

Nov. 8, 2017 (JP) .............................. JP2017-215785

(51) Int. Cl.
| | |
|---|---|
| *H01M 50/24* | (2021.01) |
| *H01M 50/20* | (2021.01) |
| *H01M 10/658* | (2014.01) |
| *H01M 50/463* | (2021.01) |

(52) U.S. Cl.
CPC ......... *H01M 50/24* (2021.01); *H01M 10/658* (2015.04); *H01M 50/20* (2021.01); *H01M 50/463* (2021.01); *H01M 2200/00* (2013.01)

(58) Field of Classification Search
CPC ............. H01M 2/1094; H01M 2/1016; H01M 2/1077; H01M 50/466; H01M 50/463; H01M 50/20; H01M 50/209; H01M 50/24; H01M 10/658
See application file for complete search history.

(56) References Cited

U.S. PATENT DOCUMENTS

| | | | |
|---|---|---|---|
| 2012/0247107 A1* | 10/2012 | Balk ................... | H01M 2/0217 60/718 |
| 2013/0252075 A1 | 9/2013 | Shimizu et al. | |
| 2015/0037642 A1* | 2/2015 | Pinon ................... | H01M 2/206 429/99 |

(Continued)

FOREIGN PATENT DOCUMENTS

| | | |
|---|---|---|
| EP | 2 299 535 A1 | 3/2011 |
| JP | 2007-317579 A | 12/2007 |
| JP | 2009-87761 | 4/2009 |

(Continued)

*Primary Examiner* — Jonathan G Jelsma
(74) *Attorney, Agent, or Firm* — Oblon, McClelland, Maier & Neustadt, L.L.P.

(57) ABSTRACT

According to embodiments, a battery includes: a rectangular box-shaped battery case, an inner portion of which is sealed; a battery module housed in the battery case and being an aggregation of a plurality of battery cells; and a tubular heat resistant sheet arranged between the battery case and the battery module in a state of covering an entire side surface of an inner wall surface of the battery case.

2 Claims, 9 Drawing Sheets

(56) References Cited

U.S. PATENT DOCUMENTS

2015/0064514 A1* 3/2015 Wu ............... H01M 10/658
                                            429/56
2017/0271635 A1   9/2017 Lampe-Onnerud et al.

FOREIGN PATENT DOCUMENTS

| JP | 2009-266403 A | 11/2009 |
| JP | 2013-197017 | 9/2013 |
| JP | 2013-235728 | 11/2013 |
| JP | 2016-181504 | 10/2016 |
| WO | WO 2010/058587 A1 | 5/2010 |

* cited by examiner

BATTERY

CROSS-REFERENCE TO RELATED APPLICATIONS

This application is based upon and claims the benefit of priority from Japanese Patent Application No. 2017-215785, filed Nov. 8, 2017; the entire contents of which are incorporated herein by reference.

FIELD

Embodiments described herein relate generally to a battery, such as a battery pack.

BACKGROUND

A battery module, which is an aggregation of a plurality of battery cells, is housed in a rectangular box-shaped battery case of a battery. If this battery is dropped, crushed, etc., the battery case or a battery cell inside the battery case is broken, and a short circuit is generated inside the battery cell housed in the battery case. Due to this, an electrolyte solution of the battery cell is expelled as a high temperature combustible gas. Then, the expelled combustible gas may be ignited by an electric spark generated due to a short circuit in the battery case. Preventing such ignition is necessary for safety of the battery.

DETAILED DESCRIPTION

According to embodiments, a battery includes: a rectangular box-shaped battery case, an inner portion of which is sealed; a battery module housed in the battery case and being an aggregation of a plurality of battery cells; and a tubular heat resistant sheet arranged between the battery case and the battery module in a state of covering an entire side surface of an inner wall surface of the battery case.

Figure 1:
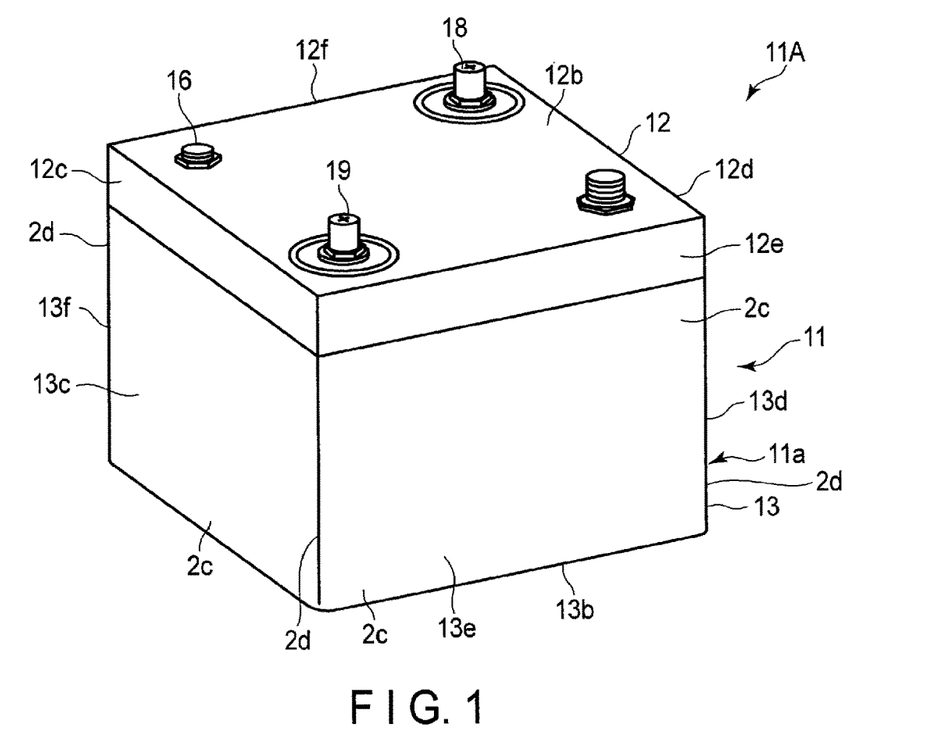
FIG. 1 is a perspective view depicting a general configuration of the entire battery according to a first embodiment.
Figure 2:
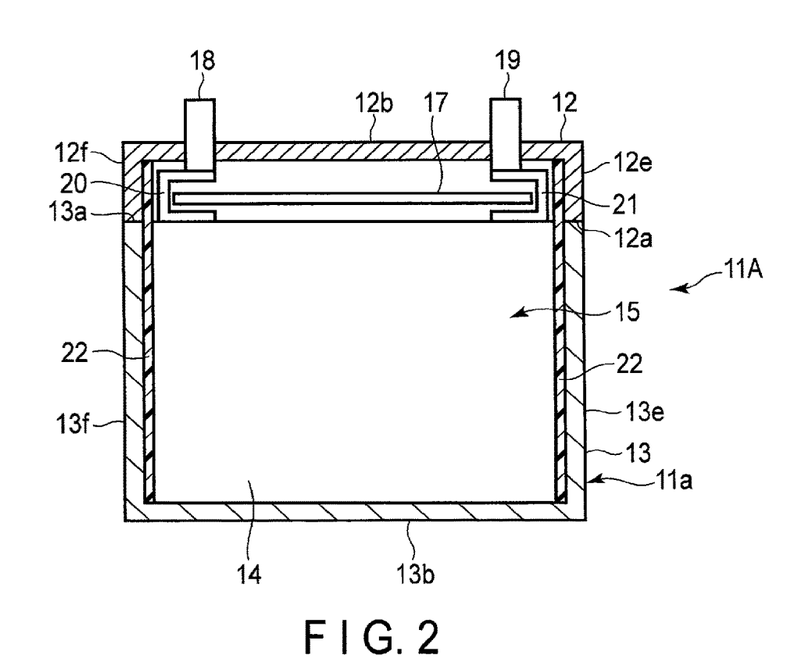
FIG. 2 is a longitudinal cross sectional view depicting an internal structure of the battery of FIG. 1.
Figure 3:
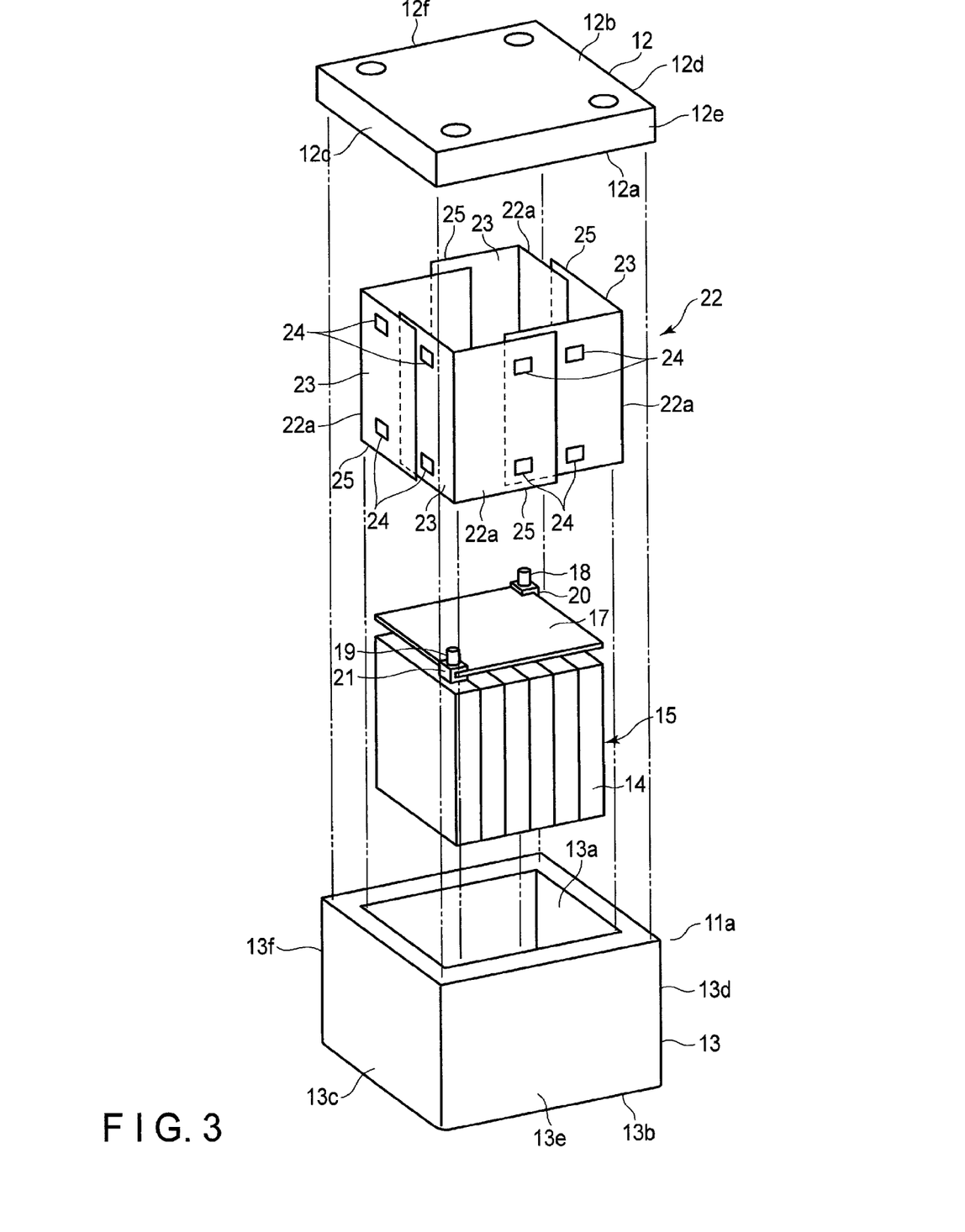
FIG. 3 is an exploded perspective view of the battery of FIG. 1.
Figure 4:
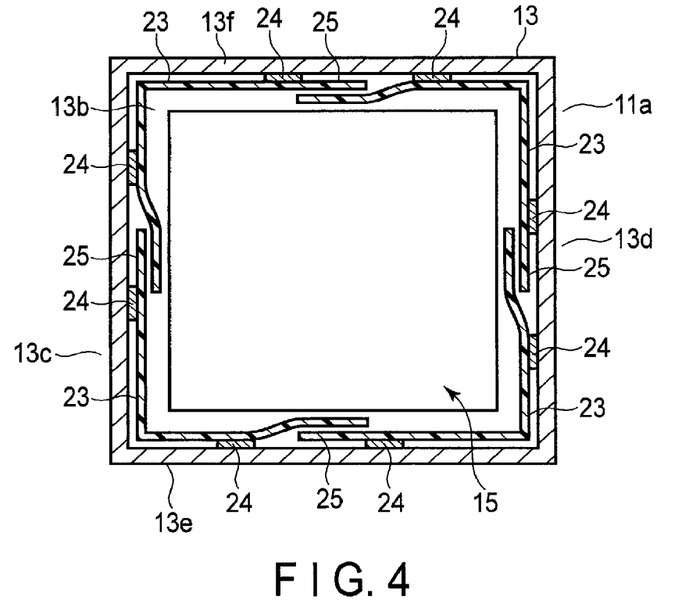
FIG. 4 is a cross sectional view depicting a mounting state of a heat resistant sheet incorporated into the battery.
Figure 5:
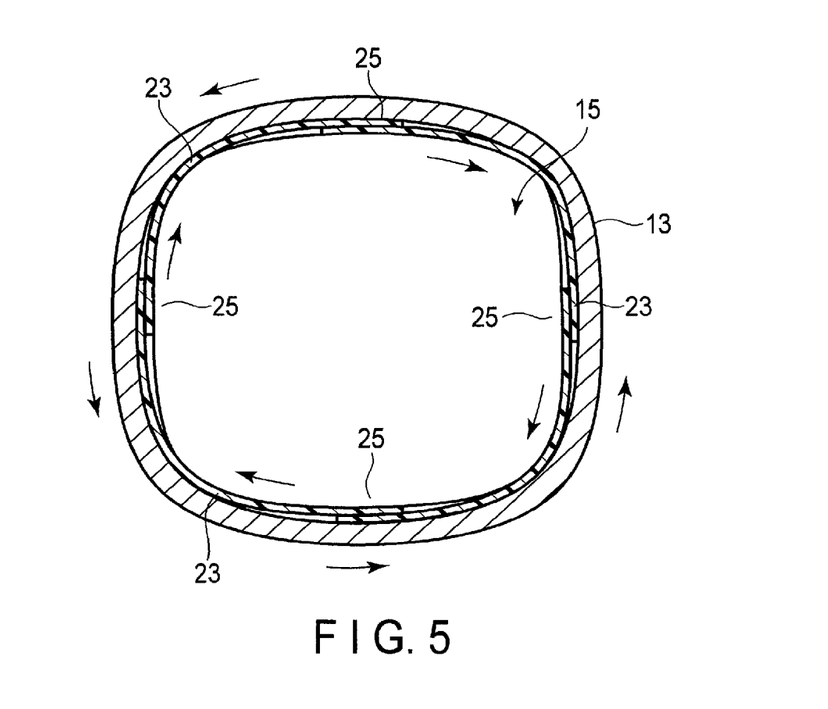
FIG. 5 is a cross sectional view depicting a state in which a battery module in the battery of FIG. 4 is expanded.

FIGS. 1 to 5 depict a first embodiment. FIG. 1 is a perspective view depicting a general configuration of the entire battery according to the first embodiment. FIG. 2 is a longitudinal cross sectional view depicting an internal structure of the battery of FIG. 1. FIG. 3 is an exploded perspective view of the battery of FIG. 1. FIG. 4 is a cross sectional view depicting a mounting state of a heat resistant sheet incorporated into the battery of FIG. 1. FIG. 5 is a cross sectional view depicting a state in which a battery module in the battery of FIG. 4 is expanded.

A battery case 11 of a battery 11A of the present embodiment comprises an upper case 12, a lower case 13, and a pressure relief portion 16. As shown in FIG. 2, the lower case 13 is a rectangular box-shaped housing in which an upper surface opening 13a is formed. This lower case 13 comprises a bottom plate 13b shaped like a rectangular flat plate, and side wall portions 13c, 13d, 13e, and 13f providing four surfaces including a front surface, a rear surface, a right surface, and a left surface.

Inside the lower case 13, a battery module 15, which is an aggregation of a plurality of battery cells 14, is housed as shown in FIG. 3. In the battery cell 14, for example, an electrode main body (coil) that is spirally wound, an electrolyte solution, etc. are housed in a cell can, a laminate film, etc. On an upper surface side of the battery module 15, a control substrate 17, a bus bar, other structural members, etc. are arranged.

The upper case 12 is a rectangular box-shaped housing in which a lower surface opening 12a is formed. This upper case 12 comprises a top plate 12b, and side wall portions 12c, 12d, 12e, and 12f providing four surfaces including a front surface, a rear surface, a right surface, and a left surface. Then, in a state in which an upper end portion of the lower case 13, in other words, an end portion on the upper surface opening 13a side, and a lower end portion of the upper case 12, in other words, an end portion on the lower surface opening 12a side, are abutted, the upper case 12 and the lower case 13 are fixed by a screw. Thereby, the upper case 12 and the lower case 13 are joined. At this time, between the lower case 13 and the upper case 12 is sealed by a packing (not shown), and an inner portion of the battery case 11 is sealed.

The upper case 12 is provided on its upper surface with a positive electrode terminal 18, a negative electrode terminal 19, the pressure relief portion 16, etc. As shown in FIG. 2, the positive electrode terminal 18 is connected to a positive electrode tab 20 of the battery module 15. The negative electrode terminal 19 is connected to a negative electrode tab 21 of the battery module 15.

The pressure relief portion 16 is formed by a waterproof vent filter allowing the air inside the battery case 11 and the air outside the battery case 11 to flow out from and into the battery case 11, respectively, while keeping the inner portion of the battery case 11 water tight. This waterproof vent filter comprises, for example, a porous PTFE film. Then, the pressure relief portion 16 is configured, when the internal pressure of the battery case 11 changes as a result of a change in surrounding atmospheric pressure, a rise in temperature, etc., to allow the air inside the battery case 11 and the air outside the battery case 11 to flow out from and into the battery case 11, in other words, to be exchanged, with the battery case 11 kept watertight. This inhibits a difference in pressure between the inside and outside of the battery case 11.

In addition, in the present embodiment, the heat resistant sheet 22 is arranged between the battery case 11 and the battery module 15. This heat resistant sheet 22 is formed from, for example, polyimide resin or Teflon (registered trademark) resin. The heat resistant sheet 22 provides an air infiltration prevention sheet preventing air from infiltrating from the outside into the inside of the battery case 11.

The heat resistant sheet 22 is made by combining four pieces of L-shaped members 23 in a rectangular frame shape in a state of being partially overlapped side by side, the four pieces of L-shaped members 23 each being made by bending a piece of a sheet main body 22a into an L shape. In other words, a part of each of two L-shaped members 23 adjacent in a circumferential direction of the heat resistant sheet 22 is overlapped with each other. In the present embodiment, the four pieces of L-shaped members 23 combined in a rectangular frame shape are arranged in a state of covering the entire side surface of the inner wall surface of the battery case 11.

Note that the side surface mentioned herein is a surface provided by the side wall portions 13c, 13d, 13e, and 13f and the side wall portions 12c, 12d, 12e, and 12f among the inner wall surfaces providing an internal space of the battery 11.

In the present embodiment, in several places of the surface of each of the L-shaped members 23, for example, one surface side of a double-sided tape 24 with relatively weak adhesion is adhered. The other side of these double-sided tapes 24 is adhered on the inner wall surface of the battery case 11. Thereby, the heat resistant sheet 22 is fixed to the inner wall surface of the battery case 11 by relatively weak force.

As shown in FIG. 4, an overlapped portion 25 of the adjacent L-shaped members 23 is not joined with each other, and is kept in a mutually freely movable state. In other words, a double-sided tape 24 is not adhered on mutually opposed surfaces of two mutually opposed portions 25.

Furthermore, the heat resistant sheet 22 is arranged in a state of covering at least a joint portion of a lateral side joining between the lower case 13 and the upper case 12 of the battery case 11, and a joint portion of a longitudinal side joining between adjacent side surfaces of the battery case 11. In the present embodiment, the joint portion of the lateral side is composed of surfaces of a lower end surface of the upper case 12 and an upper end surface of the lower case 13 which are in contact with each other.

Next, a manner of cracking of the battery case 11 of the battery 11A will be explained with reference to FIGS. 11A, 11B, 11C, and 11D. FIGS. 11A, 11B, 11C, and 11D are explanatory drawings for explaining the manner of cracking of the battery case 11 of the battery 11A. In FIGS. 11A to 11D, general configurations of the upper case 12 and the lower case 13 are shown, and the pressure relief portion 16, the positive electrode terminal 18, and the negative electrode terminal 19 are omitted.

Figure 11A:
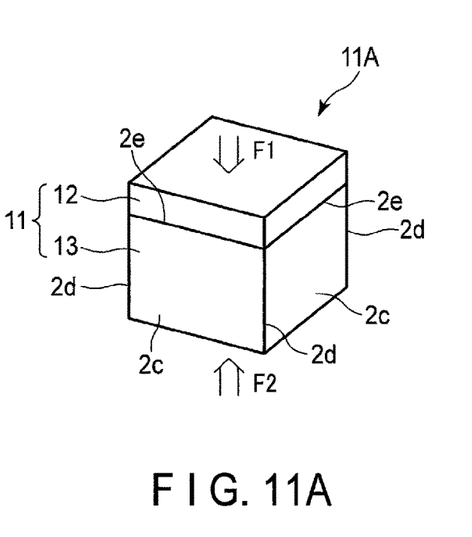
FIG. 11A is an explanatory drawing for explaining a manner of cracking of a battery case of a battery.
Figure 11B:
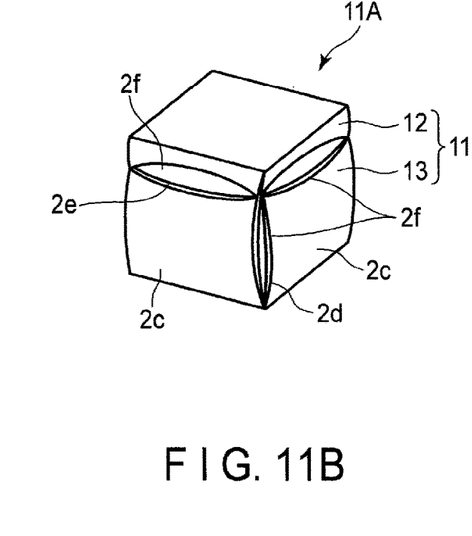
FIG. 11B is an explanatory drawing for explaining a manner of cracking of a battery case of a battery.

FIG. 11A shows a state in which forces F1 and F2 of pressing from the up and down directions are applied to the battery 11A. FIG. 11B shows a state in which the battery case 11 is partially destroyed due to the forces F1 and F2 shown in FIG. 11A.

Figure 11C:
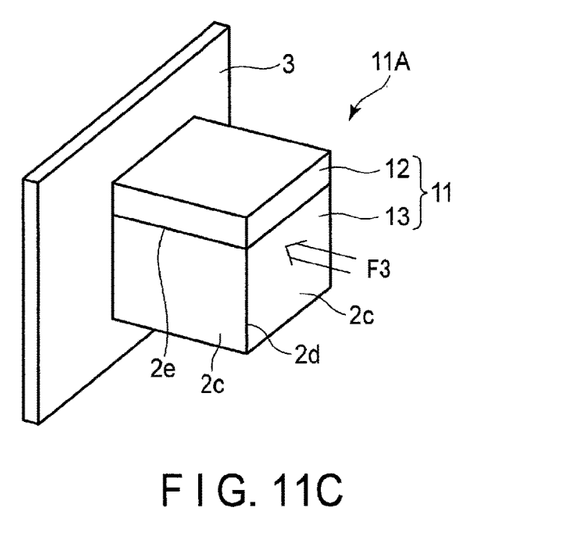
FIG. 11C is an explanatory drawing for explaining a manner of cracking of a battery case of a battery.
Figure 11D:
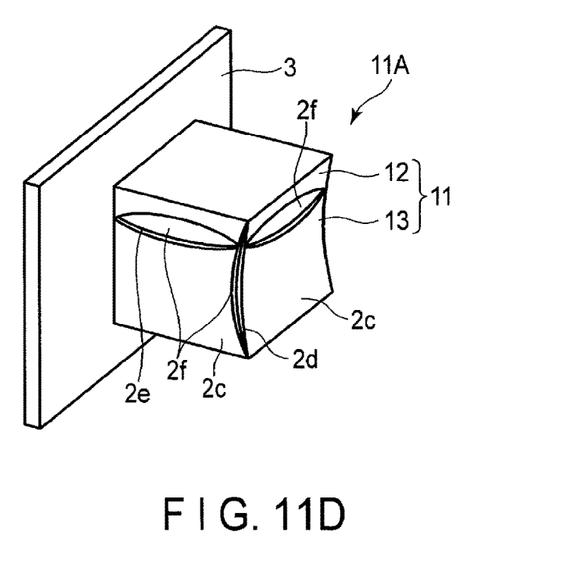
FIG. 11D is an explanatory drawing for explaining a manner of cracking of a battery case of a battery.

FIG. 11C shows a state in which the battery 11 is pressed from a lateral direction against a wall 3 provided in a vertical direction, and a force F3 of pressing from the lateral direction is applied to the battery 11. FIG. 11D shows a state in which the battery case 11 is partially destroyed due to the force F3 shown in FIG. 11C.

As shown in FIG. 11B, by the forces F1 and F2 acting on the battery 11, a crack is generated in a longitudinal side of a joint portion 2d, etc. between two circumferentially adjacent side walls 2c of the four side wall portions 2c of the battery case 11 and a lateral side of a joint portion 2e, etc. between the upper case 2a and the lower case 2b, and a large crack 2f is generated.

One of the four side wall portions 2c of the battery case 11 is composed of the side wall portion 12c of the upper case 12 and the side wall portion 13c of the lower case 13. Another side wall portion 2c is composed of the side wall portion 12d and the side wall portion 13d. Another side wall portion 2c is composed of the side wall portion 12e and the side wall portion 13e. Another side wall portion 2c is composed of the side wall portion 12f and the side wall portion 13f.

In the same manner in FIG. 11D, a crack is generated in a longitudinal side of a joint portion 2d, etc. between adjacent side walls 2c of the battery case 11 and a lateral side of a joint portion 2e, etc. between the upper case 12 and the lower case 13, and the large crack 2f is generated. The joint portion 2d is a corner between two adjacent side wall portions 2c.

Next, an interaction of the battery 11A of the present embodiment with the above configuration will be described. If external interference is applied to the battery 11A of the present embodiment due to dropping, crushing, etc., stress may be concentrated on corners of the rectangular battery case 11, and the battery case 11 may be broken, or a crack may be extended. Specifically, as shown in FIGS. 11B and 11D, a crack is generated on a longitudinal side of the joint portion 2d, etc. between the adjacent side walls 2c of the rectangular battery case 11 and a lateral side of a joint portion, etc. of the upper case 12 and the lower case 13.

For example, as shown in FIG. 11A, the pressing forces F1 and F2 from the up and down directions are applied to the battery 11, and the pressing force F3 from a lateral direction of pressing the battery 11 against the wall 3 may be applied to the battery 11 as shown in FIG. 11C. In this case, there is a possibility that a crack may be generated in a longitudinal side of the joint portion 2d, etc. between adjacent side walls 2c of the battery case 11 and a lateral side of the joint portion 2e, etc. between the upper case 12 and the lower case 13, and the large crack 2f may be generated.

At this time, in the inner portion of the battery case 11, there is a possibility that a coil of the battery cell 14 may be broken, and an internal short circuit of the battery cell 14 may be generated. Thereby, an electrolyte solution of the battery cell 14 becomes a gas, and is expelled as a combustible gas. This causes a phenomenon in which the entire battery module 15 is expanded as shown in FIG. 5.

In addition, the combustible gas in the battery cell 14 is expelled to the outside of the battery cell 14 from a safety valve (not shown) of the battery cell 14. Accordingly, the internal pressure of the battery case 11 increases, and by this pressure, the heat resistant sheet 22 is retained in a state of being pressed against an inner surface of the battery case 11.

Furthermore, the heat resistant sheet 22 is fixed to the inner wall surface of the battery case 11 by the double-sided tape 24 with relatively weak force. For this reason, as shown in FIGS. 11B and 11D, even if the crack 2f is generated in the battery case 11, the heat resistant sheet 22 slides with respect to the battery case 11 as indicated by arrows in FIG. 5, or the heat resistant sheet 22 itself extends.

Thereby, since the heat resistant sheet 22 can be prevented from being torn along with the generation of the crack 2f of the battery case 11, the crack 2f of the battery case 11 can be blocked by the heat resistant sheet 22.

In this way, in the battery 11A of the present embodiment with the above configuration, in a case where the crack 2f is generated in the battery case 11, it is possible to prevent the infiltration of air into the battery case 11 from the crack 2f of the battery case 11 by the heat resistant sheet 22 blocking the crack 2f of the battery case 11.

Accordingly, oxygen in the outside air infiltrating into the battery case 11 from the crack 2f of the battery case 11, a combustible gas expelled as gas from the inside of the battery cell 14, and electric sparks generated due to a short circuit in the battery cell 14 of the battery case 11 can be prevented from being combined. As a result, even in a case where the crack 2f is generated in the battery case 11, ignition of the battery 11A can be prevented.

In addition, in the battery 11A of the present embodiment, since the heat resistant sheet 22 is configured to be fixed to the inner wall surface of the battery case 11, it is possible to carry out an operation of fixing the heat resistant sheet 22 to the inner wall surface of the battery case 11 prior to assembling the battery module 15 to the battery case 11.

Therefore, when manufacturing the battery 11A, as compared with a case of mounting the heat resistant sheet 22 between the battery case 11 and the battery module 15 at the same time as the operation of assembling the battery module 15 to the battery case 11, the mounting operation of the heat resistant sheet 22 can be easily carried out.

Figure 6A:
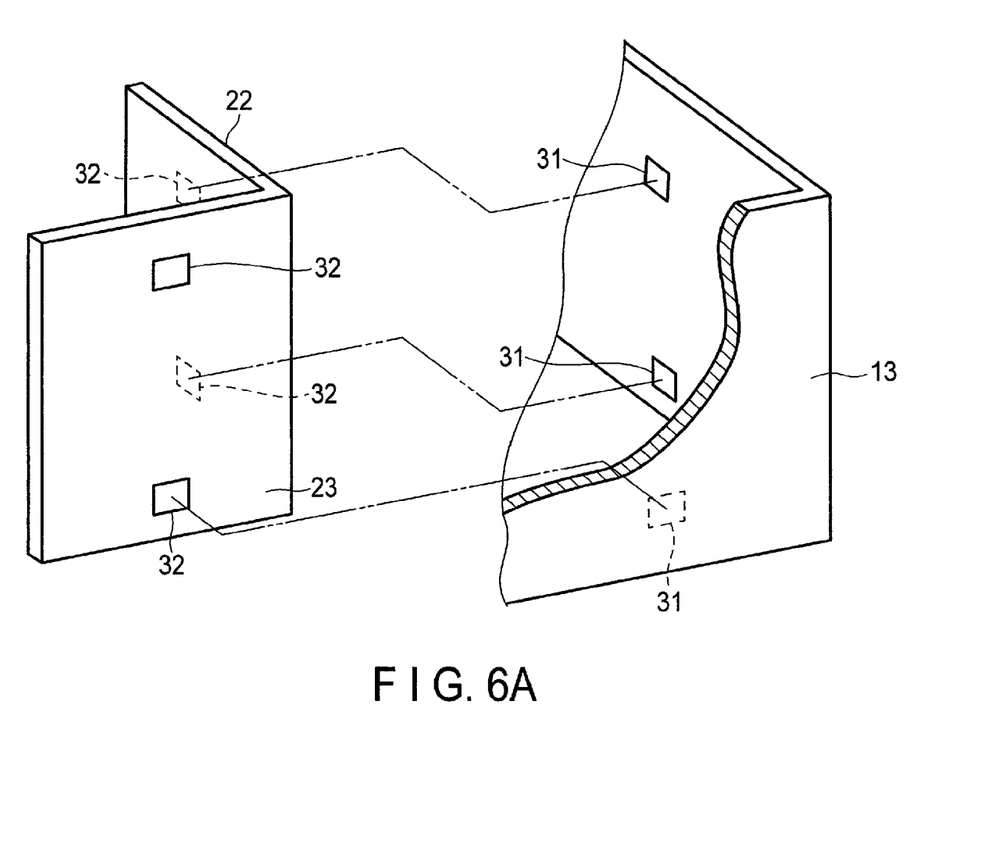
FIG. 6A is a perspective view depicting a modification of a mounting structure of mounting a heat resistant sheet in a battery case.

FIG. 6A is a perspective view depicting a modification of a mounting structure of mounting the heat resistant sheet 22 in the battery case 11 of the battery 11A of the first embodiment. Note that in FIG. 6A, identical portions as those of FIGS. 1-5 are denoted as the identical reference signs and an explanation thereof will be omitted.

In the first embodiment, the configuration in which the heat resistant sheet 22 is fixed to the inner wall surface of the battery case 11 by the double-sided tape 24 with relatively weak force was shown. In contrast, in the present modification, for example, a hook portion 31 is formed on the inner wall surface of the lower case 13, and an engagement portion 32 is provided that is loosely engaged with this hook portion 31 in a state of being slidable with the expansion of the battery case 11 as shown in FIG. 5.

Figure 6B:
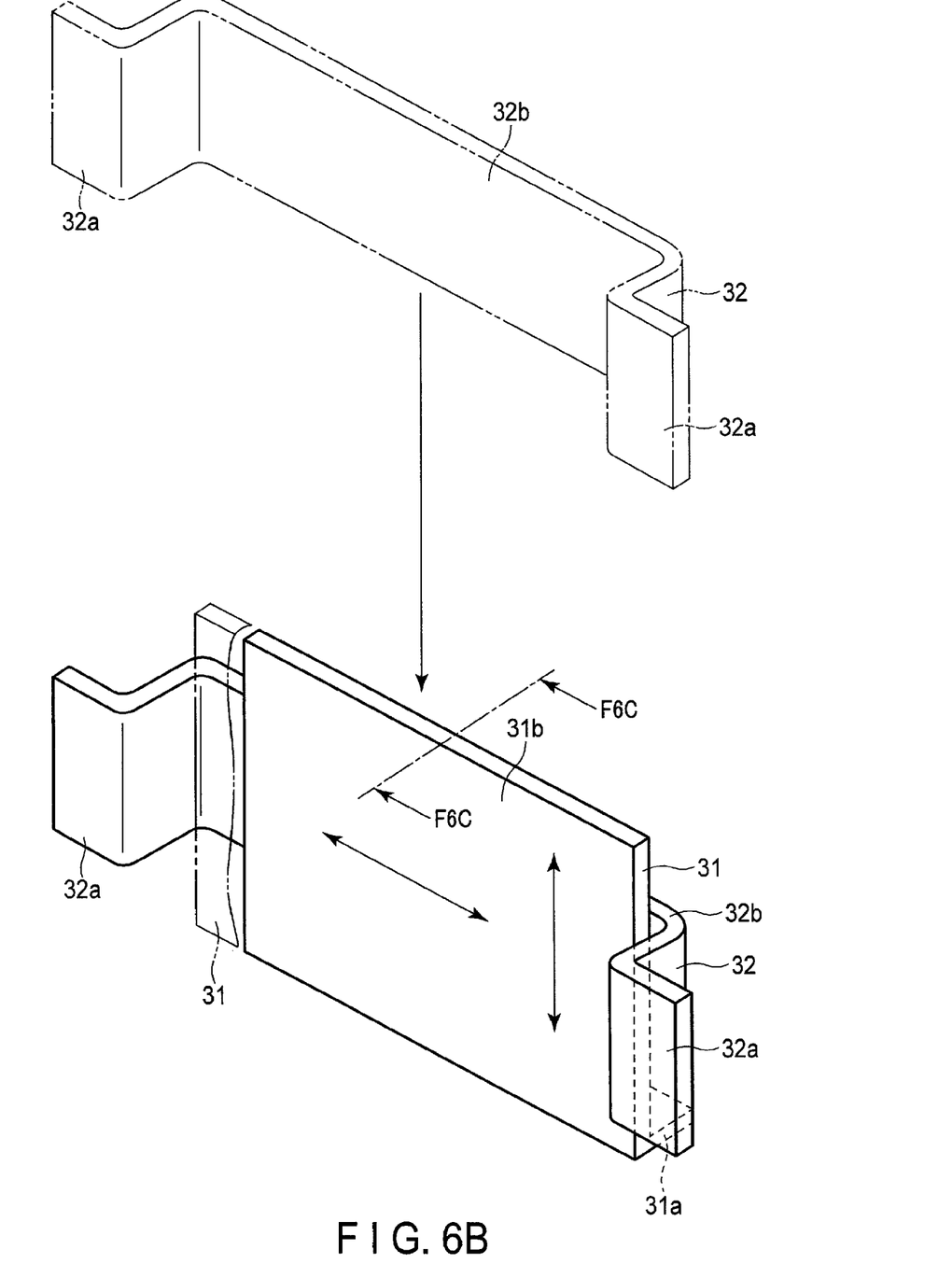
FIG. 6B is an enlarged perspective view depicting the mounting structure shown in FIG. 6A.
Figure 6C:
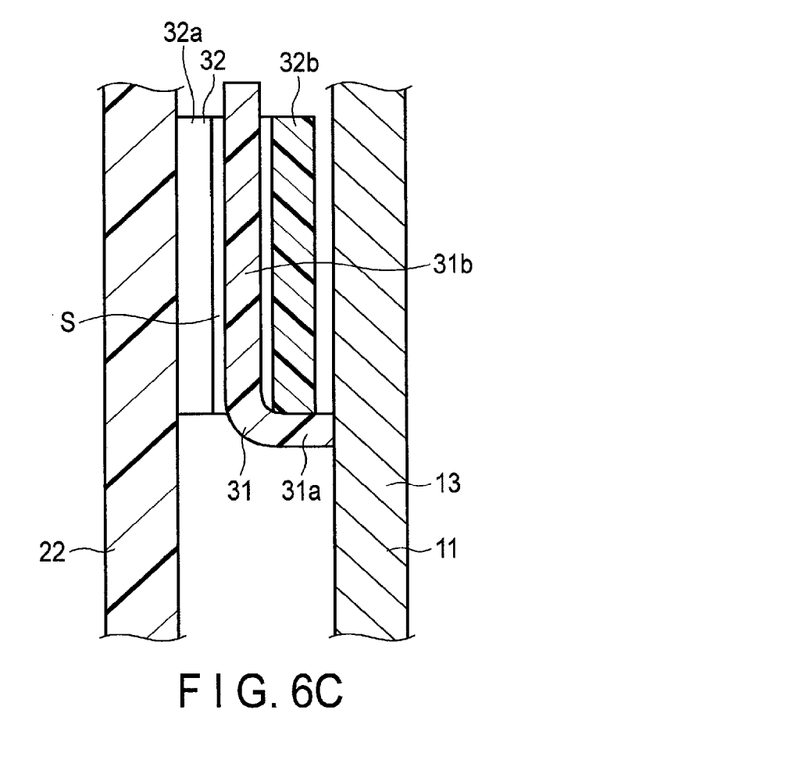
FIG. 6C is a cross sectional view depicting a state of the battery cut along a line F6C-F6C shown in FIG. 6B.

FIG. 6B is an enlarged perspective view depicting a state in which the hook portion 31 is engaged with the engagement portion 32. In FIG. 6B, the engagement portion 32 before the hook portion 31 is engaged is indicated by double-dotted chain lines. FIG. 6C is a cross sectional view depicting a state of the battery 11A cut along a line F6C-F6C shown in FIG. 6B.

As shown in FIGS. 6B and 6C, the hook portion 31 comprises, for example, a plate-like first portion 31a extending from the inner wall surface of the lower case 13 toward the inside, and a plate-like second portion 31b extending upward from the first portion 31a. The hook portion 31 configured as such can be configured by, as an example, bending a sheet of plate member.

The part of the second portion 31b is arranged in between the heat resistant sheet 22 and the engagement portion 32. A gap S allowing the second portion 31b to move with respect to the engagement portion 32 is provided between the heat resistant sheet 22 and the engagement portion 32.

Note that the moving direction mentioned herein is a moving direction with deformation of the battery case 11 as shown in FIG. 5, 11B, or 11D, including a lateral direction and a vertical direction. The lateral direction is a direction in which the side walls 2c are aligned.

The second portion 31b and the engagement portion 32 are movable with each other in the lateral direction, and thus the heat resistant sheet 22 is movable with respect to the battery case 11 in the lateral direction. The engagement portion 32, for example, has a configuration in which both lateral end portions 32a are fixed to the heat resistant sheet 22, and the gap S is provided in between the portion 32b between these both end portions 32a and the heat resistant sheet 22. The length of the portion 32b in the lateral direction is longer than that of the second portion 31b in the lateral direction.

In the present modification as well, similar to the first embodiment, even if the crack 2f is generated in the battery case 11 as shown in FIGS. 11B and 11D, the heat resistant sheet 22 can be slid between the hook portion 31 of the lower case 13 and the engagement portion 32 of the heat resistant sheet 22 in the lateral direction with respect to the battery case 11, as indicated by arrows in FIG. 5. Thereby, since the heat resistant sheet 22 can be prevented from being torn together with the generation of the crack 2f of the battery case 11 as shown in FIGS. 11B and 11D, the crack 2f of the battery case 11 can be blocked by the heat resistant sheet 22.

Figure 7:
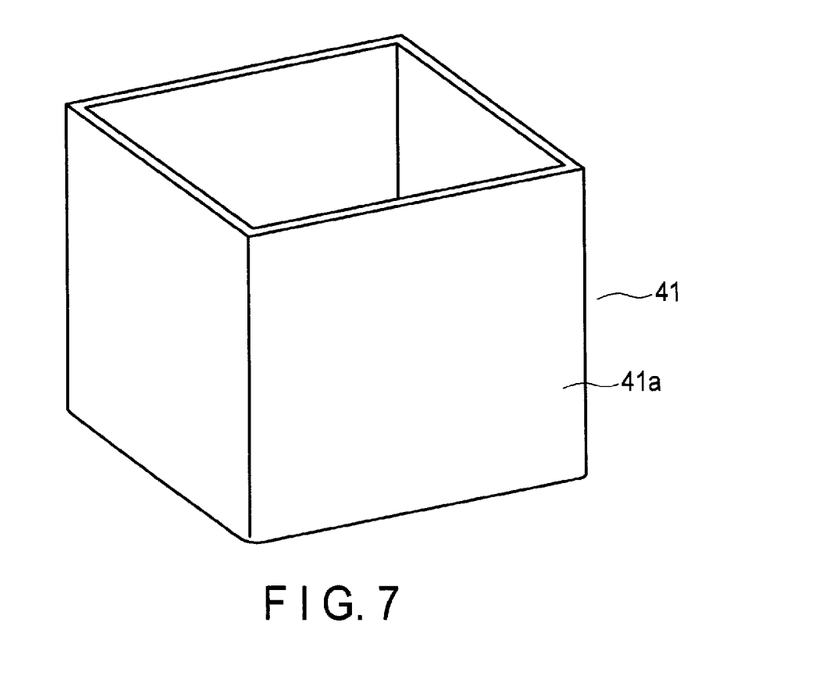
FIG. 7 is a perspective view depicting a first modification of a heat resistant sheet.

FIG. 7 is a perspective view depicting a first modification of the heat resistant sheet 22 of the battery 11A of the first embodiment. In the first embodiment, a configuration in which four L-shaped members 23 are combined in a rectangular shape in a state of being provided with portions partially overlapped side by side was shown. In contrast, the heat resistant sheet 41 of the present modification is molded by bending a piece of a sheet main body 41a into a tubular shape. In the present modification as well, the same effect as that of the first embodiment can be obtained. Furthermore, in the present modification, the heat resistant sheet 41 can be manufactured easily, and cost reduction can be achieved.

Figure 8:
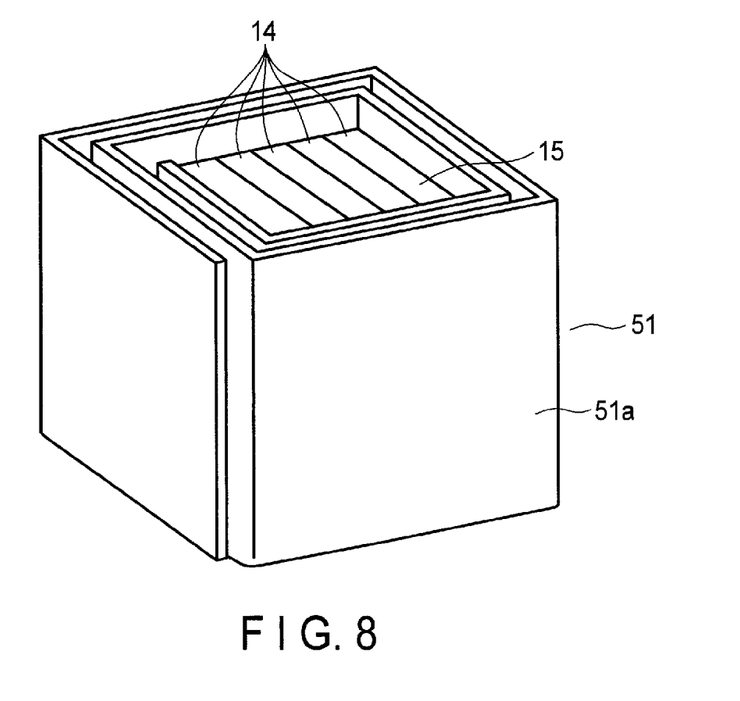
FIG. 8 is a perspective view depicting a second modification of a heat resistant sheet.

FIG. 8 is a perspective view depicting a second modification of the heat resistant sheet 22 of the battery 11A of the first embodiment. The heat resistant sheet 51 of the present modification is made by winding apiece of a sheet main body 51a around the battery module 15 multiple times. In the present modification as well, the same effect as that of the first embodiment can be obtained. Furthermore, in the present modification, manufacturing of the heat resistant sheet 51 and an operation of assembling the heat resistant sheet 51 to the battery module 15 can be easily carried out, and cost reduction can be achieved.

Figure 9:
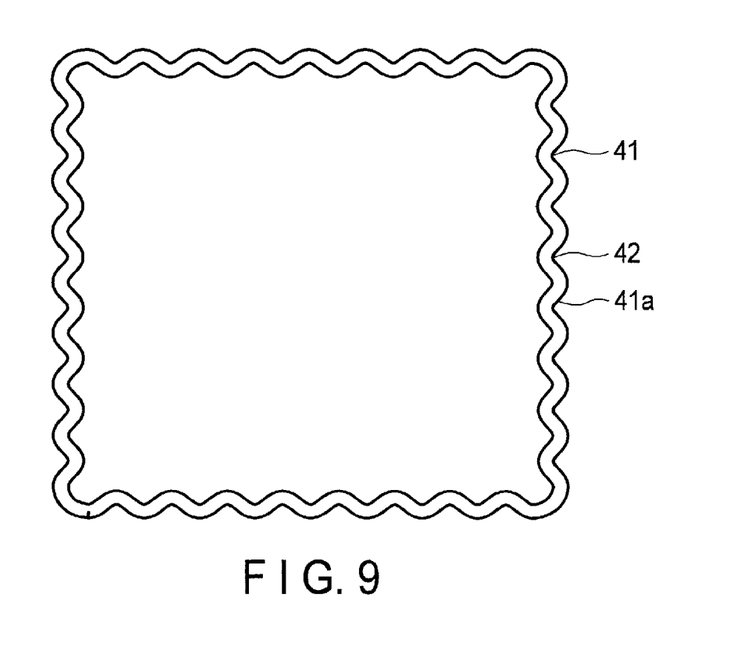
FIG. 9 is a perspective view depicting a third modification of a heat resistant sheet.

FIG. 9 is a plan view depicting another modification of the heat resistant sheet 22. The present modification provides a plurality of crease processed portions 42 made by subjecting the entire sheet main body 41a of the heat resistant sheet 41 of the first modification shown in FIG. 7 to crease processing to be approximately a wave form or a discontinuous uneven form to provide flexibility. In the present modification as well, the same effect as that of the heat resistant sheet 41 of the first modification can be obtained.

Figure 10:
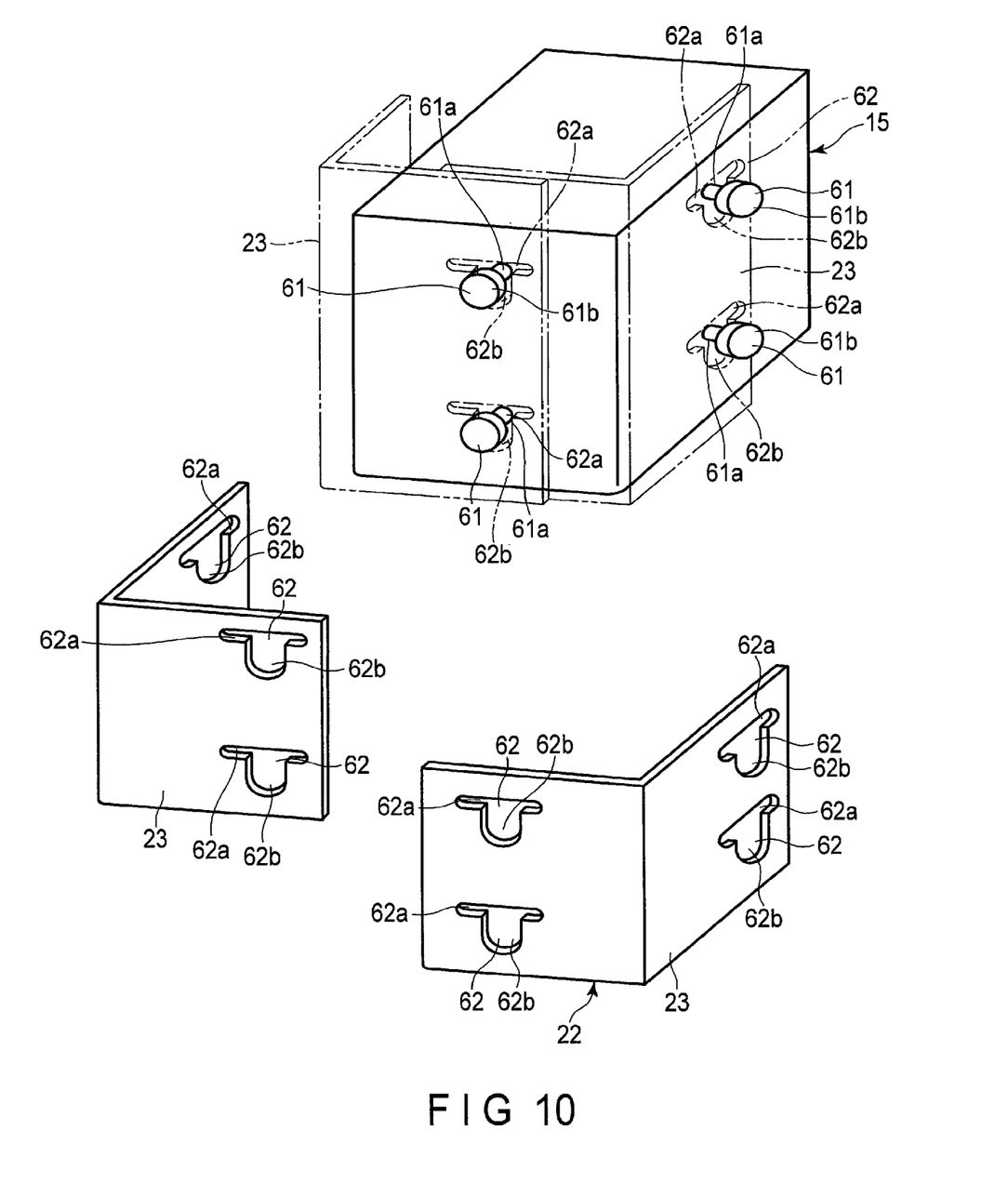
FIG. 10 is a perspective view depicting a main configuration of a battery of a second embodiment.

FIG. 10 is a perspective view depicting a main configuration of a battery of a second embodiment. Note that in FIG. 10, identical portions as those of FIGS. 1-5 are denoted by the identical reference signs, and an explanation thereof will be omitted. In the present embodiment, a plurality of engagement pins 61 are provided on each of four surfaces including a front surface, a rear surface, a right surface, and a left surface of the battery module 15. In the present embodiment, for example, two engagement pins 61 are provided on one surface of the battery module 15. The two engagement pins 61 formed on one surface are aligned in the vertical direction.

Each engagement pin 61 comprises an axial portion 61a and a locking portion 61b. The length of the axial portion 61a in an axial direction is longer than the thickness of two pieces of the heat resistant sheets 22.

The locking portion 61b is formed in a head portion of the axial portion 61a. The locking portion 61b has a shape protruding in a direction orthogonal to the axial direction of the axial portion 61a with respect to the axial portion 61a. In the present embodiment, the axial portion 61a and the locking portion 61b are respectively formed in a cylindrical shape arranged on the same axis. Then, the outer diameter of the locking portion 61b is larger than that of the axial portion 61a.

Furthermore, in the present embodiment, four L-shaped members 23 combined in a rectangular shape with portions partially overlapped side by side like the first embodiment are used. This heat resistant sheet 22 is provided with a plurality of engagement holes 62. Each of the plurality of engagement holes 62 is engaged so as to be engaged/disengaged with the engagement pin 61 of the battery module 15. In the present embodiment, since the two engagement pins 61 are provided on one surface of the battery module 15, two engagement holes 62 are formed in each of two segments of the heat resistant sheet 22.

In this engagement hole 62, an insertion portion 62b through which the locking portion 61b of the engagement pin 61 can be inserted, and a fine groove portion 62a communicating with this insertion portion 62b are formed. The fine groove portion 62a is configured so that the axial portion 61a of the engagement pin 61 can be inserted, and the locking portion 61 cannot be inserted. The fine groove portion 62a is communicated to upper end of the insertion portion 62b.

The fine groove portion 62a, when the battery case 11 deforms as shown in FIG. 5, 11B, or 11D, has a length allowing the heat resistant sheet 22 to move with respect to the battery module 15 with the deformation of the battery case 11.

In the present embodiment, as an example, the fine groove portion 62a extends in the lateral direction from the upper end of the insertion portion 62b. Thus, the engagement hole 62 is configured to be in substantially a T shape.

Then, the locking portion 61b of the engagement pin 61 is inserted through the insertion portion 62b of each of the two adjacent heat resistant sheets 22. When the locking portion 61b is inserted through the insertion portion 62, the two heat resistant sheets 22 fall with respect to the engagement pin 61 by their own weight. As the two heat resistant sheets 22 fall with respect to the engagement pin 61, the axial portion 61a of the engagement pin 61 is movable into the fine groove portion 61a.

Thus, the axial portion 61a of each of a plurality of engagement pins 61 is movable into the fine groove portion 62a of one engagement hole 62 of each of the two heat resistant sheets 22. In this way, four heat resistant sheets 22 are movably attached around the battery module 15. In FIG. 10, two pieces of the four pieces of L-shaped members 23 attached to the battery module 15 are indicated by double-dotted chain lines.

In the present modification, since the engagement pin 61 can be inserted through each of the two engagement holes 62 of each of the two segments of the heat resistant sheet 22, the heat resistant sheet 22 is configured to be bendable when being attached to the battery module 15.

Thereafter, the heat resistant sheet 22 is, in a state of being adhered in advance to four surfaces including a front surface, a rear surface, a right surface, and a left surface of the battery module 15, housed in the lower case 13 integrally with the battery module 15. Thereby, the heat resistant sheet 22 is arranged in a gap between the battery case 11 and the battery module 15. The heat resistant sheet 22 is set in a gap between the battery case 11 and the battery module 15 in a state of being movable between the battery case 11 and the battery module 15. The movable state mentioned herein is, as described above, a state in which the axial portion 61a of the engagement pin 61 of the battery module 15 is arranged in the fine groove portion 62a of one engagement hole 62 of each of the two heat resistant sheets 22, or a state in which the axial portion 61a is positioned between fine groove portions 62a. In this state, since the axial portion 61a is movable along the fine groove portion 62a, the two heat resistant sheets 22 are respectively movable with respect to the battery module 15.

In the present embodiment as well, similar to the first embodiment, even if the crack 2f is generated in the battery case 11 as shown in FIGS. 11B and 11D, the heat resistant sheet 22 can be slid between the lower case 13 and the battery module 15 with respect to the battery case 11 as indicated by arrows in FIG. 5. Thereby, the heat resistant sheet 22 can be prevented from being torn together with the generation of the crack 2f of the battery case 11, the crack 2f of the battery case 11 can be blocked by the heat resistant sheet 22.

Therefore, even if the crack 2f is generated in the battery case 11, ignition of the battery 11A can be prevented. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
   a rectangular box-shaped battery case, an inner portion of which is sealed;
   a battery module housed in the battery case and being an aggregation of a plurality of battery cells;
   a tubular heat resistant sheet arranged between the battery case and the battery module in a state of covering an entire side surface of an inner wall surface of the battery case;
   wherein the battery case comprises:
   a rectangular box-shaped lower case, an upper surface of which is opened and into which the battery module is housed; and
   a rectangular box-shaped upper case, a lower surface of which is opened and joined with the lower case in a state of blocking an upper surface opening of the lower case,
   wherein the heat resistant sheet is arranged in a state of covering at least a joint portion and a longitudinal side portion, the joint portion being a lateral side joint portion joining between the lower case and the upper case of the battery case, and the longitudinal side portion being a longitudinal side portion between adjacent side surfaces of the battery case, and wherein,
the heat resistant sheet comprises four pieces of L-shaped members combined in a rectangular frame shape, in a state of providing portions partially overlapped side by side,
each of the four pieces of L-shaped members includes a piece of sheet main body bent into an L shape,
each of the four pieces of L-shaped members is adhered on the inner wall surface of the battery case by a double-sided tape, and
overlapped portions of two adjacent L-shaped members are movable.

2. The battery of claim 1, wherein the heat resistant sheet is formed from polyimide resin or Teflon resin, and is an air infiltration preventing sheet preventing air from infiltrating into the battery case.

* * * * *